(12) United States Patent
Goodyear, Jr.

(10) Patent No.: US 9,332,768 B2
(45) Date of Patent: May 10, 2016

(54) FINGER PAD ASSEMBLY

(71) Applicant: E. William Goodyear, Jr., Charlotte, NC (US)

(72) Inventor: E. William Goodyear, Jr., Charlotte, NC (US)

(73) Assignee: WILLIAM GOODYEAR COMPANY, Monroe, NC (US)

( * ) Notice: Subject to any disclaimer, the term of this patent is extended or adjusted under 35 U.S.C. 154(b) by 0 days.

(21) Appl. No.: 14/820,940

(22) Filed: Aug. 7, 2015

(65) Prior Publication Data

US 2016/0037789 A1   Feb. 11, 2016

Related U.S. Application Data

(60) Provisional application No. 62/034,572, filed on Aug. 7, 2014.

(51) Int. Cl.
*A22C 21/02* (2006.01)

(52) U.S. Cl.
CPC .................... *A22C 21/022* (2013.01)

(58) Field of Classification Search
CPC .. A22C 21/00; A22C 21/0061; A22C 21/022; A22C 21/028
USPC ............................... 452/71, 86–97
See application file for complete search history.

(56) References Cited

U.S. PATENT DOCUMENTS

| | | | | |
|---|---|---|---|---|
| 3,218,668 A * | 11/1965 | Engkjer | ............... | A22C 21/022 452/91 |
| 4,873,747 A * | 10/1989 | Dewberry | ............ | A22C 21/022 452/93 |
| 7,066,805 B2 * | 6/2006 | Turner | ................. | A22C 21/022 452/88 |
| 7,070,494 B2 * | 7/2006 | Rapp | .................... | A22C 21/022 452/88 |
| 7,575,509 B2 * | 8/2009 | Chattin | .............. | A22C 21/0061 452/95 |
| 7,648,412 B2 * | 1/2010 | Kjeldsen | .............. | A22C 21/022 452/88 |
| 8,986,079 B2 * | 3/2015 | Remmer | .............. | A22C 21/022 452/86 |

* cited by examiner

*Primary Examiner* — Richard Price, Jr.
(74) *Attorney, Agent, or Firm* — Ralph H. Dougherty

(57) ABSTRACT

A unitary resilient rubber finger pad for a poultry plucking machine, and a finger pad assembly for such machine, the assembly having: a backing plate with a central aperture adapted for engaging a drive hub of a poultry feather plucking machine; a finger pad having a base with a central mounting aperture, a flat rear face abutting the backing plate and a front face opposite the rear flat face, a plurality of fingers extending from the front; a star washer having a plurality of arcuate recesses on its periphery, each of which engages a base of a finger; and a mounting bolt for attaching said finger pad assembly to a drive shaft having a threaded hole in the end thereof. The method of mounting the finger pad assembly is also disclosed.

11 Claims, 5 Drawing Sheets

FINGER PAD ASSEMBLY

CROSS REFERENCE TO RELATED APPLICATION

This application claims the benefit of U.S. Provisional Application No. 62/034,572, filed Aug. 7, 2014.

FIELD OF THE INVENTION

This invention relates generally to equipment used in connection with poultry feather picking machines, and particularly to an improved poultry feather-plucking device having integral resilient picking fingers.

BACKGROUND OF THE INVENTION

Machines for plucking the feathers from poultry are used in poultry processing plants. These plucking (or picking) machines typically have drums and/or discs to which resilient rubber or similar material picking fingers are mounted. The drums or discs are positioned along each side of a path of travel along which birds are conveyed. The drums or discs are rotated at speeds as high as 600 to 1250 rpm causing the resilient fingers to be continuously driven into contact with the birds. Frictional forces between the rubber fingers and the feathers remove the feathers from the bird. However, the fingers tend to wear quickly, with an average processing line requiring replacement of from 8,000 to 10,000 fingers per month. With many processing plants running several processing lines, it is common for a plant to replace one half million fingers per year.

Picker fingers typically have an enlarged disc-shaped base formed with an annular recess from which a tapered, furrowed shank extends. Each finger is individually installed in a disc with the annular recess of the finger base located within a hole in the support disc or drum, with the recess edges abutting and gripping opposite sides of the rim about the hole of the support disc. Worn fingers are often removed from the disc by cutting the finger at its annular recess. The two pieces can then be removed. A new finger is installed by insertion through the enlarged hole in the disc until its tapered surface adjacent its enlarged base engages the rim about the hole. The shank is then pulled with a substantial degree of force in order to seat the annular recess about the edge of the hole. It is difficult to seat the picking fingers within the disc holes manually due to the amount of force required in pulling their base portions into the support holes. Further, the region of the disc and the attached fingers becomes dirty and "gummy" from the fat from the birds and dust from the feathers. A substantial amount of strength is required to seat replacement fingers, and the space available in which to work is usually quite restricted making it awkward to exert the force needed to properly seat the annular recess about the hole edge. Also, substantial training of the personnel doing the finger replacement is required. A prior art mechanism utilized individual fingers mounted to extend through mating holes in a support plate, and having a backing plate abutting the rear of the support plate to hold each finger securely. To ensure that the backing plate and the support plate rotated as a unitary piece, an integrated centrifugal locking mechanism was utilized. This locking mechanism was required to hold the support plate and the backing plate together tightly when the disc assembly was rotating at its maximum velocity.

In addition, it should be noted that the finger locking mechanism becomes inoperable after a few hours due to gumming from the poultry fat and from debris and fat clogging the locking mechanism, and often fingers break off, requiring replacement for either reason.

A plucking machine typically has 64 discs of ten fingers each, and there are usually four machines in a plucking line. Wholesale changes of fingers are often required. To change the fingers on a single machine at the present time requires from 4 to 7 man hours per machine. It should also be noted that during finger changes, frequently some of the rubber fingers are dropped into a drain or an offal tray.

SUMMARY OF THE INVENTION

The present invention is a novel unitary disc and rubber finger pad assembly that allows an operator to easily install, remove, and replace the entire plucking finger pad assembly without the necessity of applying excessive force. Installation, removal, and replacement of the finger pad assembly is accomplished quickly, easily and comfortably, and does not require training of the operators. With the present invention, a single person can change all of the fingers in one machine in 30 minutes, a greater than 80% reduction in finger replacement time. In addition, since the finger pads being handled are larger than individual fingers, there is very little droppage, resulting in 70% less rubber in the drains.

The novel rubber plucking finger pad assembly of the present invention does not have the annular recess and oversized shank that was present in the fingers of the prior art, nor must they be installed or replaced individually.

The assembly consists of a backing plate, a unitary rubber finger plate, with fingers protruding from one side, a generally star-shaped washer the outer periphery of which is adapted to abut the base of each of the fingers, and a retaining means comprising a mounting bolt, washer, and lock washer, as required or desired to fasten and retain the assembly onto the end of a drive shaft of the plucking machine. The finger pad has a flat face which is placed against the backing plate, the backing plate engages a drive shaft of the plucking machine, and is held onto the drive shaft by the mounting bolt.

OBJECTS OF THE INVENTION

It is the principal object of the invention to provide an improved resilient rubber finger assembly for the plucking of feathers from poultry.

It is another object of the invention to provide an improved resilient rubber finger assembly that can be easily and quickly mounted, removed, and replaced onto a drive shaft of a plucking machine.

It is also an object of the invention to provide an improved resilient rubber finger assembly in which the fingers are unitary with a finger pad.

It is also an object of the invention to provide an improved resilient rubber finger assembly which requires fewer pieces than are currently required.

It is also an object of the invention to provide an improved resilient rubber finger assembly which is configured to avoid damage during the installation procedure.

BRIEF DESCRIPTION OF THE DRAWINGS

The foregoing and other objects will become more readily apparent by referring to the following detailed description and the appended drawings in which.

DETAILED DESCRIPTION

Figure 1:
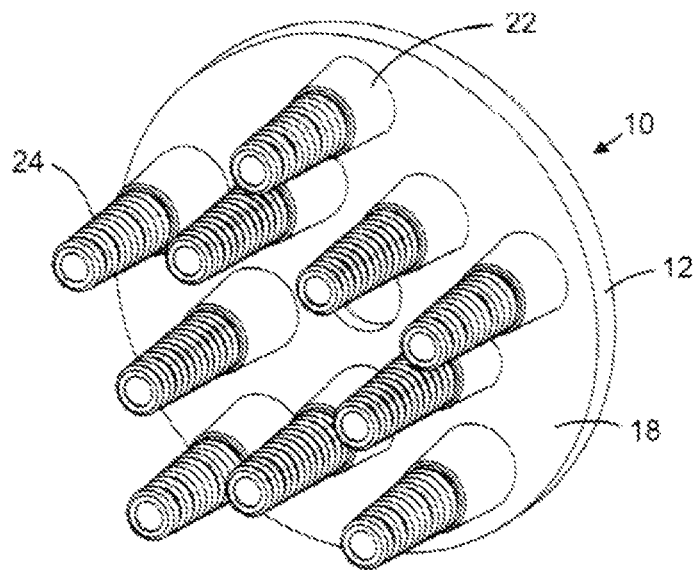
FIG. 1 is a front isometric view of the invented resilient rubber finger pad.
Figure 2:
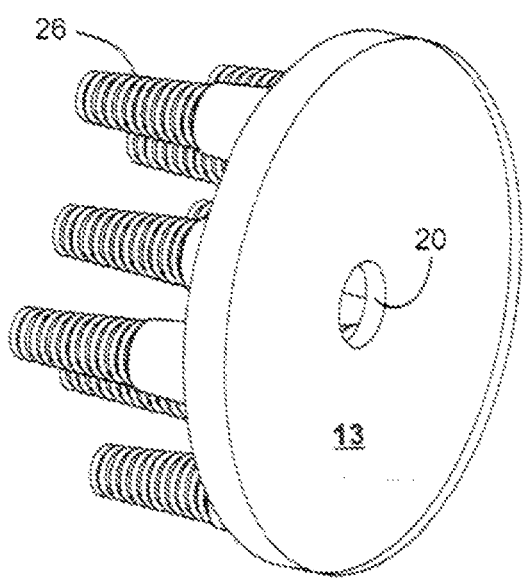
FIG. 2 is a rear isometric view of the finger pad.
Figure 3:
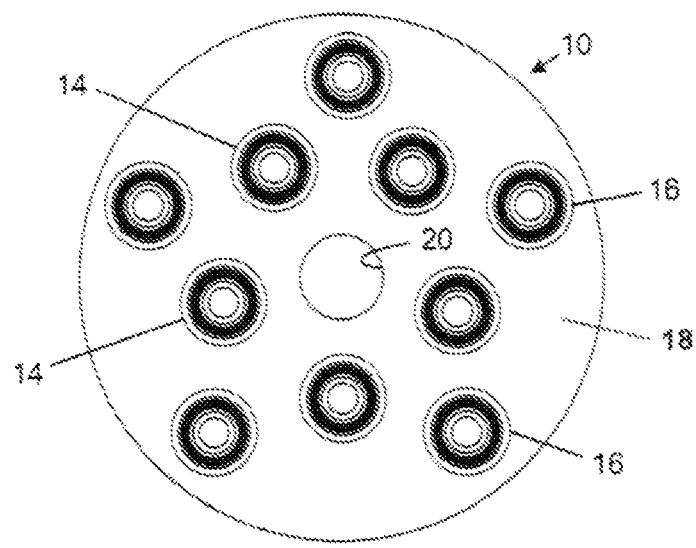
FIG. 3 is a front view of the resilient rubber finger pad of FIG. 1.
Figure 4:
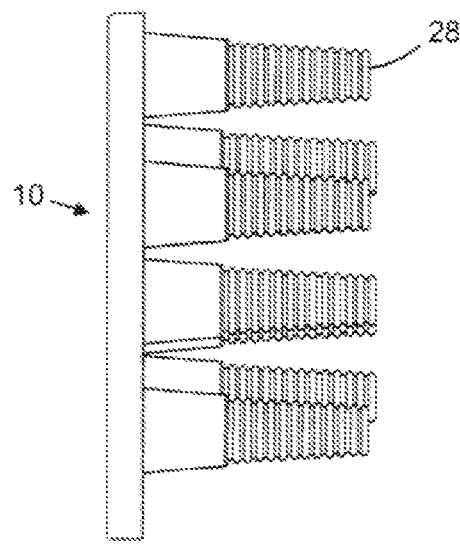
FIG. 4 is a left side view of the invented rubber finger pad; the right side view being a mirror image thereof.
Figure 5:
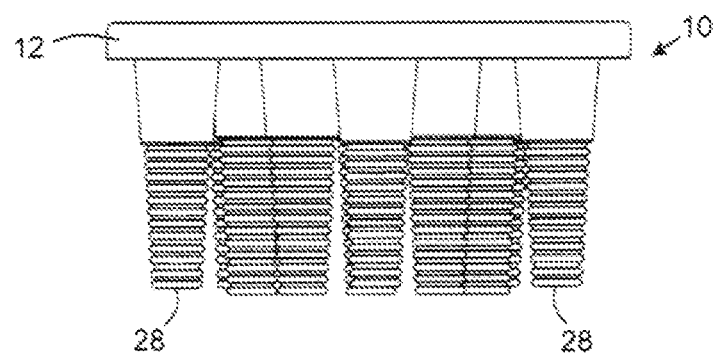
FIG. 5 is a top view of the invented finger pad, the bottom view being a mirror image thereof.

Referring now to the drawings, finger pad 10 is a unitary molded item which includes a circular base 12 having a rear face 13, which may have a raised lip 15 on the perimeter thereof, and an opposed or front face 18 from which a ring of integral inner fingers 14 extend, and a ring of integral outer fingers 16 which also extend from face 18 of the base 12, and a central aperture 20.

The finger pad 10 is preferably made of a natural rubber, or alternatively of a synthetic material, that provides adequate friction to effectively remove feathers from the poultry carcass, but is also sufficiently pliable that a carcass is not damaged from repeated impacts by the spinning fingers. Alternative materials include, but are not limited to synthetic rubbers, styrene-butadiene rubber, isoprene rubber, butadiene rubber, ethylene-propylene rubber, butyl rubber, chloroprene rubber, nitrile rubber, and combinations thereof. The natural or synthetic rubber compositions can include various additives, such as tackifiers, pigments, anti-oxidants, and/or anti-UV.

Advantageously ten fingers are molded into the finger pad and two concentric circles of five fingers each extend normally from face 18 of the finger pad 10. Integral fingers 14 form an inner circle or ring of fingers, and integral fingers 16 form an outer circle or ring of fingers. The fingers themselves each have an enlarged base 22, and a tapered shank 24. The shank is the operational part of the finger that actually comes into contact with a poultry carcass, and removes feathers therefrom. The fingers are advantageously provided with a grip pattern 26, which can be a series of furrows, a series of rings, or other pattern on the shank. The grip pattern provides increased friction between the finger and the feathered carcass, which thus improves the removal of feathers when the machinery is in operation. The fingers extend perpendicularly (normally) from the face 18 of the finger pad base 12, usually for a distance of about 2.8 to about 3.3 inches. Outer integral fingers 16 are preferably shorter than the inner integral fingers 14 by about 0.2 to 0.4 inch, which limits breakage of the tips 28 of the outer fingers 16 during operation.

As an Example, a base may be provided with 5 fingers on the inner circle of the finger pad, which inner fingers extend about 3 inches from the unitary base, and with 5 fingers on the outer circle of the finger pad, which outer fingers extend about 2.7 inches from the unitary base. Thus, the length of each of the fingers in the outer ring of fingers is from 7 to 13 percent shorter than the length of each of the fingers in the inner ring of fingers.

It should be noted that in current plucking machines, fingers vary in length as well as shape.

Star washer 40 is a generally flat plate, made of plastic or stainless steel, and has a central aperture 42 and a series of arcs 44 and 46 on its periphery to abut each of the finger bases 22 when positioned on the face 18 of the finger pad. The outer arcs 44 abut the base 22 of each of the fingers in the outer circular ring, and the inner arcs 46 abut the base 22 of each of the fingers in the inner circular ring of fingers.

Figure 8:
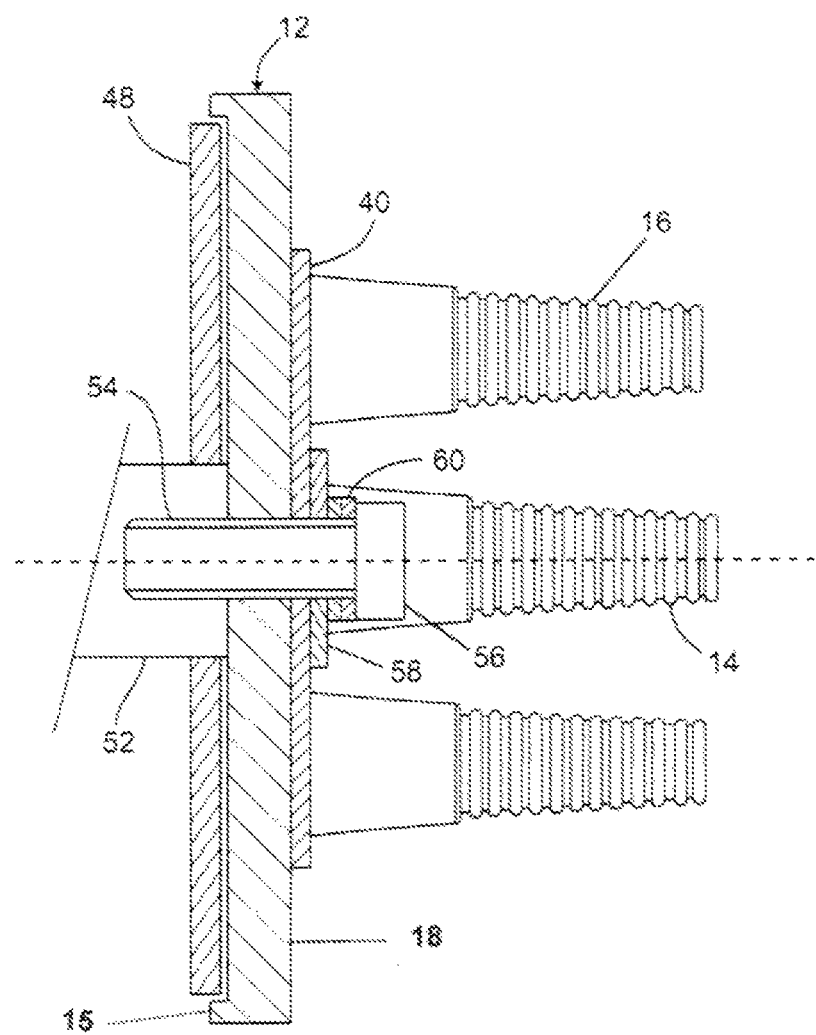
FIG. 8 is a vertical sectional view of the invented finger pad assembly attached to a plucking machine shaft in accordance with the invention.

Backing plate or base plate 48 has a diameter equal to or slightly less than that of the finger pad base 12, which allows it to be situated in sealing arrangement within or against the raised lip 15 of the base 12. Backing plate 48 can be seated within peripheral lip 15 as shown in FIG. 8, or it can be mounted to abut the rear face of lip 15. The backing plate 48 is provided with a central aperture 50 for engaging the hub drive shaft 52 of the plucking machine.

Figure 6:
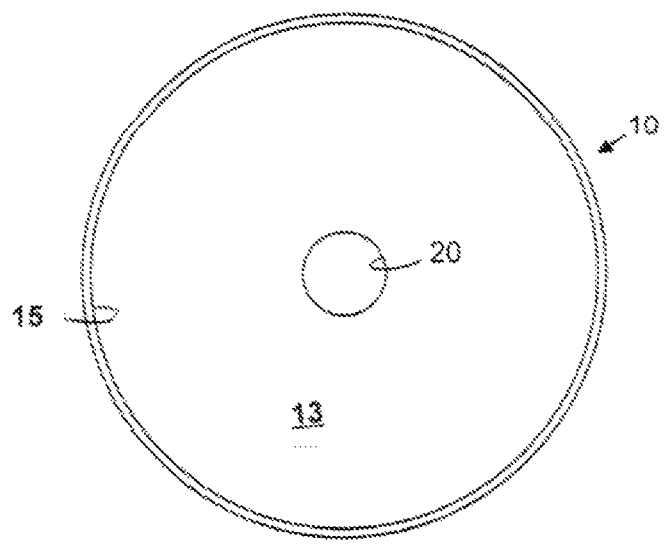
FIG. 6 is a rear view of the invented finger pad.
Figure 7:
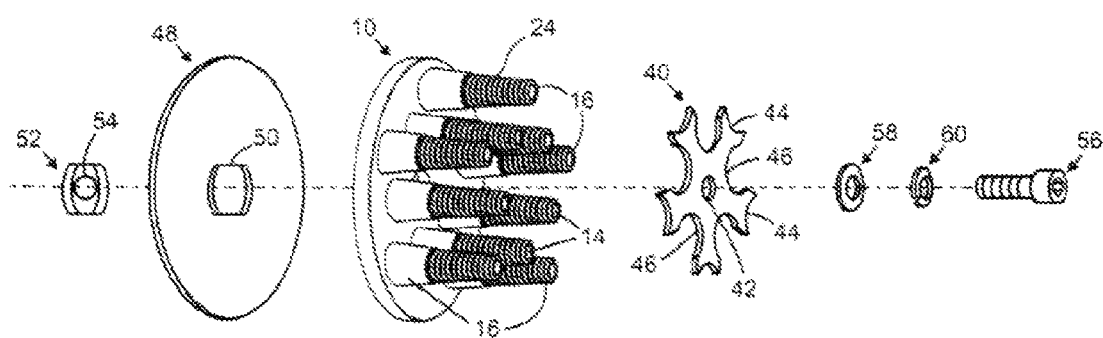
FIG. 7 is an exploded view of the invented finger pad assembly.

A single threaded mounting bolt 56 is adapted to engage a threaded central hole 54 in the end of the hub drive shaft 52. When assembled, the finger pad assembly has a washer 58 and a lock washer 60 between the mounting bolt and the star washer, as shown in FIG. 6, to hold the finger pad assembly securely onto the shaft 52.

When finger pad 10 needs to be replaced, the finger pad is removed by the mere removal of the single mounting bolt 56, a new finger pad is substituted between the backing plate 48 and the star washer 40, and is fastened to the hub drive shaft 52 by the single mounting bolt 56. Thus, finger replacement can be accomplished without the difficulty encountered in replacement of fingers in prior art devices.

SUMMARY OF THE ACHIEVEMENT OF THE OBJECTS OF THE INVENTION

From the foregoing, it is readily apparent that I have invented a novel resilient rubber finger pad assembly for use with poultry feather plucking machines, and to a method of mounting, securing and replacing a resilient picking finger assembly in a poultry feather-plucking device, which assembly is easily and quickly mounted, and easily removed and replaced by an untrained operator, and which requires fewer parts than are currently required in plucking machines.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

I claim:

1. A finger pad assembly for the processing of poultry carcasses, comprising:
    a backing plate having a central aperture
    a unitary finger pad having a circular base, a central mounting aperture in said base, a rear face for abutting said backing plate and an opposing front face, a plurality of fingers extending normally from said opposing front face, said plurality of fingers being arranged in two concentric rings of fingers;
    a star washer having a central aperture and a plurality of arcuate recesses on its periphery, each of which recess is adapted to engage a base of a finger; and
    a mounting bolt insertable through central aperture of said star washer and said central mounting aperture of said finger pad for attaching said finger pad assembly to a drive shaft having a threaded hole in the end thereof to receive said mounting bolt.

2. A finger pad assembly according to claim 1, wherein said finger pad is made of natural or synthetic rubber.

3. A finger pad assembly according to claim 1, wherein said finger pad is made from a material selected from the group consisting of styrene-butadiene rubber, isoprene rubber, butadiene rubber, ethylene-propylene rubber, butyl rubber, chloroprene rubber, nitrile rubber, and combinations thereof.

4. A finger pad assembly according to claim 1 wherein said star washer is made of plastic.

5. A finger pad assembly according to claim 1, wherein said star washer is made of stainless steel.

6. A finger pad assembly according to claim 1, further comprising a lock washer positioned between said star washer and said mounting bolt.

7. A finger pad assembly according to claim 1, wherein said plurality of fingers are arranged in two concentric rings of fingers comprising an inner ring of fingers and an outer ring of fingers, each finger of said outer ring being shorter than each finger of said inner ring.

8. A finger pad assembly according to claim 7, wherein said plurality of fingers in said inner ring extend about 2.8 to about 3.3 inches from said base.

9. A finger pad assembly according to claim 7, wherein said plurality of fingers in said inner ring extend about 0.2 to about 0.4 inches further from said base than said fingers in said outer ring.

10. A finger pad assembly according to claim 1, wherein all of said plurality of fingers are provided with a grip pattern thereon.

11. A method for attaching a finger pad assembly to a plucking machine for the plucking of poultry carcasses, said method comprising:

providing a hub drive shaft on said plucking machine having a threaded hole in the end thereof;

providing a finger pad assembly for the processing of poultry carcasses, comprising:
  a backing plate having a central aperture adapted for engaging a drive hub of a poultry feather plucking machine;
  a unitary finger pad having a circular base with a flat face, said base being provided with a central mounting aperture, a flat face for abutting said backing plate and an opposing face to which a plurality of fingers are fixed and extend therefrom; each of said fingers having a base, a tapered shank, and a grip pattern on a portion of said shank remote from said base, said fingers being arranged as a pair of concentric rings of fingers on said base;
  a star washer having a plurality of arcuate recesses on its periphery, each of which engages a base of a finger; and
  a mounting bolt and lock washer for attaching said finger pad assembly to a drive shaft;

assembling said finger pad assembly; and connecting said finger pad assembly to said hub drive shaft with said mounting bolt and lock washer.

\* \* \* \* \*